United States Patent [19]

Barzuza

[11] Patent Number: 5,514,270
[45] Date of Patent: May 7, 1996

[54] PLURAL LAYER FIBER FILTER ELEMENT AND SYSTEM FOR CLEANING

[75] Inventor: Ytzhak Barzuza, 1a Frankfurter Street, Petach Tikvah, Israel

[73] Assignees: Filtration Ltd., Petach Tikvah; Ytzhak Barzuza, Herzlia, both of Israel

[21] Appl. No.: 231,183

[22] Filed: Apr. 22, 1994

[30] Foreign Application Priority Data

Apr. 28, 1993 [IL] Israel ......................................... 105537

[51] Int. Cl.⁶ .................................................... B01D 29/68
[52] U.S. Cl. ........................ 210/356; 210/411; 210/413; 210/420; 55/294
[58] Field of Search ...................... 210/356, 85, 86, 210/91, 107, 108, 243, 385, 388, 391, 392, 393, 394, 407, 409, 411, 412, 413, 414, 420; 55/271, 272, 283, 294

[56] References Cited

U.S. PATENT DOCUMENTS 4,382,866  5/1983  Johnson ................................ 210/243
4,780,151  10/1988  Barazuza .
4,915,835  4/1990  Barazuza et al. .
4,929,363  5/1990  Barazuza .
5,268,095  12/1993  Barzuza .

FOREIGN PATENT DOCUMENTS 0119340  9/1984  European Pat. Off. .
0641969  3/1984  Switzerland .

*Primary Examiner*—W. L. Walker
*Attorney, Agent, or Firm*—Greenblum & Bernstein

[57] ABSTRACT

A filter element and a system for cleaning the filter element, including a plurality of layers of fibers arranged in substantially uniform orientation over at least a portion of their active length, along which portion at least, each of the fibers is disposed in close proximity to its adjacent fibers, and a body member constituting a backing surface for the fibers. The system further includes nozzle means for applying at least one fluid jet against the fibers; and means for applying a relative movement between the fiber layers and the fluid jet.

7 Claims, 1 Drawing Sheet

PLURAL LAYER FIBER FILTER ELEMENT AND SYSTEM FOR CLEANING

BACKGROUND OF THE INVENTION

1. Technical Field

The present invention relates to a filter element and a system for cleaning the element. More particularly, the present invention relates to a filter element comprising a plurality of fibers of a substantially uniform orientation disposed in close proximity to each other, and to fluid-emitting nozzle means for cleaning said element.

2. Description of the Prior Art

Fluid filters comprising threads in various orientations are known. Fluid filters are also known which consist of threads stretched between two members.

The present invention is concerned with the manner of cleaning such filters, since the common methods of forward and back flushing have proved not to be very effective for cleaning them. Moreover, experiments have shown that the mere application of fluid jets against the fibers, irrespective of the pressure applied, is not sufficiently effective to pry loose the dirt which has adhered to the fibers.

It is therefore a broad object of the present invention to provide a filter element consisting of fibers and a system for cleaning the same by means of a fluid jet, which system ameliorates the problems of insufficient cleaning of said prior art filters.

SUMMARY OF THE INVENTION

The present invention achieves the above objective by providing a filter element and a system for cleaning said filter element, comprising a plurality of layers of fibers arranged in substantially uniform orientation over at least a portion of their active length, along which portion at least, each of said fibers is disposed in close proximity to its adjacent fibers; a body member constituting a backing surface for said fibers; nozzle means for applying at least one fluid jet against the fibers; and means for applying a relative movement between said fiber layers and said fluid jet.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENT(S)

Figure 1:
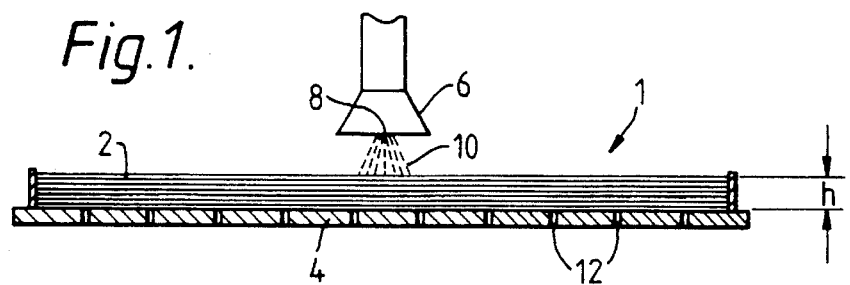
FIG. 1 is a cross-sectional view across a filter element and a cleaning nozzle according to the present invention.

Referring first to FIG. 1, there is shown a fluid filter element 1, comprising a plurality of layers 2 composed of fibers. The fibers are arranged to assume a substantially uniform orientation, wherein each of the fibers is disposed in close proximity to its adjacent fibers. The filter element further comprises a body member 4, constituting a backing surface for the fiber layers 2. Body member 4 may have any suitable configuration; it may be flat, cylindrical, conical, or the like.

Further seen is a nozzle 6, having an opening or outlet 8 through which is emitted a fluid jet 10. The body member 4 may be provided with apertures 12 at least along a portion thereof, and its faces may be roughened or otherwise finished. The filter element 1 and/or the nozzle 6 are adapted to move with respect to each other, so that a jet 10 issuing from the nozzle will sweep mainly along the fiber layers 2 in a reciprocative motion. The movable nozzle may also be provided with a superposed component of a lateral or transverse relative displacement, so as to cause the fluid jet to spray across at least some of the fiber layers.

The cleaning of filter element 1 according to the present invention is effected by spraying a jet of fluid against the fiber layers 2, which jet is calculated to penetrate through the fiber layers by moving the fibers aside. The jet then impacts the body member 4, and then rebounds from the body member to impinge on the fibers from behind. The unfiltered matter, or dirt, which was caught by the fibers during the filtering action, is thus impacted by the rebounding fluid from the direction opposite to the direction of filtration and is swept upwards or outwards, thus being extracted from within the fibers and brought up to the surface of the filter element, to be washed away.

Hence, contrary to the teachings of the prior art, it is the above-described combination of a fluid jet emitted from a nozzle and sprayed against the filter element with sufficient force and with relative movement between the jet and the filter element, which results in the superior cleaning of a fiber filter. This movement should preferably be mainly in the longitudinal direction, namely, in the direction of orientation of, or above, the fibers.

Several further conditions should advantageously be met in order to achieve an even more efficient cleaning of the filter. The direction of the jet with respect to the plane of the fiber layers should be substantially perpendicular to said plane and, in any case, not less than 45° with respect thereto. Furthermore, a relationship has been determined between the overall thickness h [see FIG. 1] of the fiber layers or strata of a filtering medium, the dimensions of the outlet 8 of the nozzle 6 from which the fluid jet is emitted, and the pressure of the jet. These parameters will, inter alia, determine the jet's capability to penetrate the fiber layers, impact the backing surface and bounce off the same, to pry loose the dirt and move it towards the outside surface of the filter.

Experiments conducted to determine the relationships between the various parameters which govern such a system showed that the overall thickness h of the fiber layers, in millimeters, is determined by the expression:

$$h \leq \frac{P \cdot A^{1.5} \cdot B^{1.5} \cdot (\delta 2/\delta 1)^{0.2}}{B^2 \cdot n \cdot T[0.01 + 100(\mu B/R)] + 5.4 \cdot 10^3}$$

wherein:

P is the fluid pressure in dyne per $cm^2$;

A is the width of the nozzle's outlet in the direction of the fibers, in cm;

B is the width of the nozzle's outlet in the direction across the fibers, in cm:

$\delta_1$ is the specific weight of a first fluid in the fluid jet in gram mass/cm$^3$;

$\delta_2$ is the specific weight of a second, heavier fluid, which is mixed with the first fluid, in gram mass/cm$^3$;

n is the number of fibers in a cross-section of one cm$^2$ of the fiber layers;

T is the tensional load on a single fiber in dynes;

μ is the coefficient of friction between the fibers; and

R is the radius of curvature of the fiber layers which is closest to the radius of curvature of the body member, in cm.

As can be understood from the above expression, since the fluid jet has to penetrate through the fiber layers, i.e., the fluid jet has to move the fibers aside in order to reach the surface of the body member and rebound therefrom, the thickness of the fiber layers should be calculated so that, on the one hand, there will be provided a maximum thickness for achieving an effective filtering action; however, on the other hand, this thickness should not exceed the fluid jet's capability to effectively clean the filter element. Therefore, calculations, combined with experimental results, produced the above expression for calculating the desired thickness of the fiber layers of a fiber filter element cleanable by a fluid jet.

Figure 2:
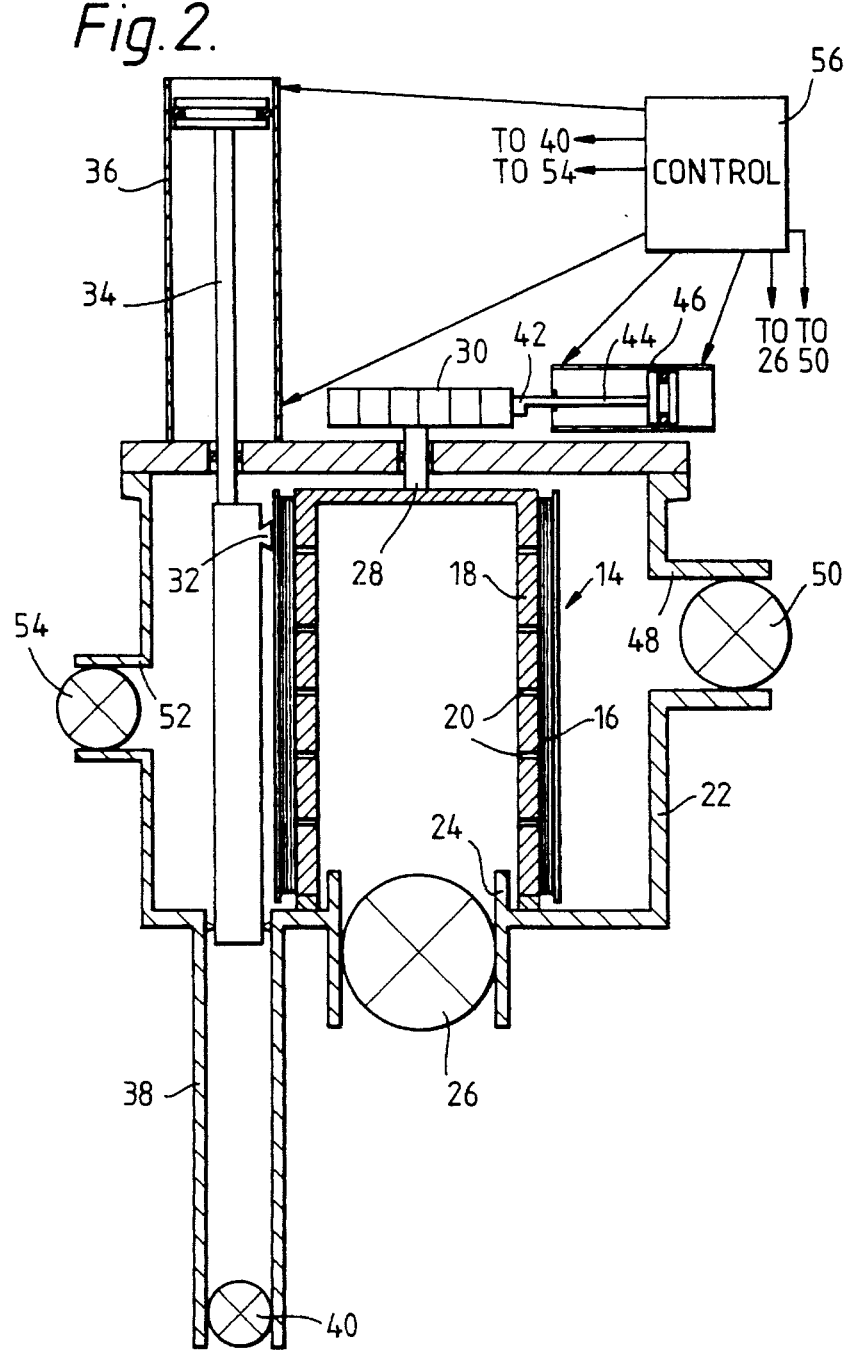
FIG. 2 is a cross-sectional view across a fluid filter system incorporating a filter element and a cleaning nozzle according to the present invention.

An example of a fluid filter system incorporating a filter element and a nozzle for the cleaning of said element in accordance with the present invention, is shown in FIG. 2. As shown, the filter system consists of a filter element 14 in the form of a cylinder, comprising layers 16 of fibers stretched along a body member 18 having apertures 20. The filter element is rotatably mounted inside the filter housing 22, between an outlet port 24 having a valve 26, and an axle 28 leading through the housing to a ratchet wheel 30. Adjacent to the layers 16 of fibers, there is disposed a nozzle 32, movably suspended in the housing by means of a piston 34 inside a cylinder 36. Nozzle 32 is fed with cleaning fluid via a pipe 38, which is controlled by valve 40. The movement of ratchet wheel 30 is governed by an engaging pawl 42 attached to the end of a piston rod 44, movable with piston cylinder 46.

Housing 22 is further provided with an inlet port 48 which is closable by valve 50, and with a cleaning outlet port 52, having a valve 54.

The operation of the filter system is governed by a control unit 56, the functions of which are indicated schematically. For normal filtering action, valves 26 and 50 are open, while valves 40 and 54 are closed. Fluid entering inlet port 48 is filtered by the filter element 14 and exits through port 24.

When the filter element is to be cleaned, the control unit 56 closes valves 26 and 50 and opens valves 40 and 54. Cleaning fluid, i.e., liquid, gas, a mixture of liquid and gas, or two kinds of liquids, enters nozzle 32 through valve 40 and pipe 38, and is sprayed on fiber layers 16, as described and explained hereinabove with reference to FIG. 1. The cleaning fluid is drained off, together with the loose dirt, through outlet port 52.

Control unit 56 further causes the reciprocal movement of nozzle 32 along the fiber layers 16 by applying and removing pressures into and out of cylinder 36 on both sides of the piston, as is known. As the nozzle completes at least one cycle of its reciprocating movement, the control unit effects the movement of the piston in cylinder 46 so as to rotate the filter by one step, aligning an adjacent area of the fiber layers of the filter element with the nozzle. In such a way, the entire surface area of the filter element will be sequentially cleaned.

Obviously, one nozzle may have several apertures, so that more than one jet of fluid may be sprayed onto the fiber layers at the same time, at the same, or different, locations. Also, the arrangement could be such that one nozzle system could direct cleaning jets on two or more areas of the fiber layers, so that one reciprocating movement of the nozzle will simultaneously apply cleaning fluid onto several locations on a filter element. A plurality of spaced-apart nozzles could also be provided.

Furthermore, while the illustrated embodiment shows a relative movement between the nozzle and the filter element, wherein the nozzle is adapted to reciprocally move along the fibers of the filter, arrangements are envisaged wherein the filter element could move in relation to a stationary nozzle, or wherein both the nozzle as well as the filter element move with respect to each other.

It should also be pointed out that, while usually the filter element will be cleaned by a jet of fluid sprayed thereon, as described hereinabove, the present invention also encompasses situations in which a first fluid, e.g., a liquid, is applied to the filter element, which filter element is then sprayed by a second fluid, e.g., a gas or a second liquid. In such a case, the lighter fluid will be sprayed by the nozzle, while the heavier fluid will be the fluid which is otherwise first applied to the filter element.

Furthermore, in order to achieve a greater effectiveness in the cleaning capability of the filter element, it is proposed to polarize the latter by pre-treating the filter medium by processes identical, or similar, to those used in the production of ion exchangers or membranes in electrodialysis. The polarizing or charging of the filter medium, or selected parts thereof, to a positive, a negative, or portions positive and other portions negative, will have the effect of attracting particles of opposite charge, and repelling particles of the same charge, from the fluid to be filtered.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A filter element and a system for cleaning said filter element, comprising:

a plurality of layers each containing a number of tensioned fibers having a known coefficient of friction therebetween and arranged in substantially uniform orientation over at least a portion of their active length, along which portion at least, each of said fibers is disposed in close proximity to its adjacent fibers;

a body member with a surface of a given radius of curvature constituting a backing surface for said fibers;

nozzle means having at least one outlet for applying a mixture of two fluids in the form of at least one pressurized fluid jet against the fibers; and means for applying relative movement between said fiber layers and said fluid jet, wherein the overall thickness h of the fiber layers is determined by the expression:

$$h \leq \frac{P \cdot A^{1.5} \cdot B^{1.5} \cdot (\delta 2/\delta 1)^{0.2}}{B^2 \cdot n \cdot T[0.01 + 100 \, (\mu B/R)] + 5.4 \cdot 10^3}$$

wherein:

P is the fluid pressure of the jet in dynes per $cm^2$;

A is the width of the nozzle's outlet in the direction of the fibers, in cm;

B is the width of the nozzle's outlet in the direction across the fibers, in cm:

$\delta 1$ is the specific weight of a first fluid in the fluid jet, in gram mass/$cm^3$;

$\delta 2$ is the specific weight of a second, heavier fluid, which is mixed with the first fluid, in gram mass/$cm^3$;

n is the number of fibers in a cross-section of one $cm^2$ of the fiber layers;

T is the tensional load on a single fiber in dynes;

μ is the coefficient of friction between the fibers; and

R is the radius of curvature of the fiber layers which is closest to the radius of curvature of the body member, in cm.

2. The filter element and system as claimed in claim 1, wherein said relative movement is substantially in the direction along the fibers.

3. The filter element and system as claimed in claim 1, wherein said body member is provided with a plurality of apertures, at least over a portion thereof.

4. The filter element and system as claimed in claim 1, wherein said body member is cylindrical.

5. The filter element and system as claimed in claim 1, wherein at least a portion of the surface of said body member is roughened.

6. The filter element and system as claimed in claim 1, wherein at least portions of said fibers are polarized.

7. The filter element and system as claimed in claim 5, wherein a portion of said fibers is polarized so as to be positively charged, while another portion of said fibers is polarized so as to be negatively charged.

* * * * *